(12) United States Patent
Schreiber

(10) Patent No.: US 11,163,662 B2
(45) Date of Patent: Nov. 2, 2021

(54) SYSTEM AND METHOD FOR ANALYZING BUS DATA

(71) Applicant: Rohde & Schwarz GmbH & Co. KG, Munich (DE)

(72) Inventor: Philipp Schreiber, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/788,832

(22) Filed: Feb. 12, 2020

(65) Prior Publication Data

US 2021/0248055 A1    Aug. 12, 2021

(51) Int. Cl.
*G06F 11/34* (2006.01)
*G06F 11/30* (2006.01)
*G06F 13/20* (2006.01)

(52) U.S. Cl.
CPC ...... *G06F 11/3452* (2013.01); *G06F 11/3041* (2013.01); *G06F 11/349* (2013.01); *G06F 13/20* (2013.01)

(58) Field of Classification Search
CPC .. G06F 11/3485; G06F 11/30; G06F 11/3466; G06F 11/3041; G06F 11/349; G06F 11/3452; G06F 13/20
See application file for complete search history.

(56) References Cited

U.S. PATENT DOCUMENTS

| | | | | |
|---|---|---|---|---|
| 5,896,552 A | * | 4/1999 | Kowert | G01R 31/3177 710/55 |
| 2006/0155516 A1 | * | 7/2006 | Johnson | G06F 11/349 702/186 |
| 2007/0266183 A1 | * | 11/2007 | Lanning | G06F 11/221 710/1 |
| 2009/0122852 A1 | * | 5/2009 | Smith | H04L 1/205 375/228 |
| 2018/0337754 A1 | * | 11/2018 | Diegmann | H04W 72/02 |

FOREIGN PATENT DOCUMENTS

EP    2058668 A1    5/2009

* cited by examiner

*Primary Examiner* — Raymond N Phan
(74) *Attorney, Agent, or Firm* — Christensen O'Connor Johnson Kindness PLLC

(57) ABSTRACT

A bus data analysis method comprises the steps of receiving an input signal, decoding the input signal according to a protocol, thereby extracting a data signal from the input signal, and analyzing the data signal extracted from the input signal statistically, thereby generating a statistically analyzed data signal. Furthermore, a bus data analysis system is described.

20 Claims, 1 Drawing Sheet

SYSTEM AND METHOD FOR ANALYZING BUS DATA

FIELD OF THE DISCLOSURE

Embodiments of the present disclosure relate generally to a bus data analysis method. Further, embodiments of the present disclosure relate generally to a bus data analysis system.

BACKGROUND

In recent years, parallel data buses have been replaced by high-speed serial data buses. Serial data buses are used extensively in modern electronic devices, as they offer significant cost advantages and performance improvements with respect to parallel bus communications.

The respective signal used by the serial data bus, namely the bus signal, may be an analog signal having transitions between two voltage levels that represent, respectively, a logic "1" and a logic "0". Accordingly, the serial data bus has two logical states. In general, the serial data bus uses voltage to communicate. Therefore, respective modules toggle the signal off and on, making the 1's and 0's of digital binary language like a Morse code. This code can be used to communicate commands.

In addition, a serial bus decoding takes place such that decoded data is obtained. There are two ways a test and/or measurement instrument can decode the serial bus. The first way is using a software routine. An acquisition of the bus signal is taken, generating acquired data. Then, the acquired data is analyzed before the next acquisition is taken. The second way is using hardware or circuit means, for instance an application-specific integrated circuit (ASIC) or a field programmable gate array (FPGA). This is much faster. Hence, the decoding can be done in real time. However, both ways mentioned above yield the same, namely identifying the different logic states of the bus signal in time, for instance high and low levels. In addition, a given bit rate is used creating a sequence of 1's and 0's. Once a bit stream is translated, the protocol in question must be identified and defined. Every protocol has a specific syntax, and the decoded bits are fed into this syntax to translate them to a readable information. This information can be displayed on a display device. For instance, the display device is integrated in the test and/or measurement instrument that may be established by an oscilloscope.

Generally, there is a need for a deeper insight in the data submitted by means of a bus.

SUMMARY

The present disclosure provides a bus data analysis method. In an embodiment, the method comprises the steps of:
receiving an input signal;
decoding the input signal according to a protocol, thereby extracting a data signal from the input signal; and
analyzing the data signal extracted from the input signal statistically, thereby generating a statistically analyzed data signal.

Further, the present disclosure provides a bus data analysis system for analyzing bus data. In an embodiment, the bus data analysis system comprises an input for receiving an input signal. The bus data analysis system also comprises a bus decoder for decoding the input signal, thereby extracting a data signal from the input signal. Moreover, the bus data analysis system comprises an analysis circuit or module for statistically analyzing the data signal extracted from the input signal, thereby generating a statistically analyzed data signal.

Accordingly, the present disclosure is based on the finding that a statistical analysis of the data obtained after decoding the respective input signal may take place in order to gather a deeper insight in the respective data transmitted. In other words, the statistical analysis is done on the decoded data. Thus, measurements like bus idle time, error rate and/or activity of participants of the bus can be analyzed. Moreover, the respective results of the statistical analysis can be visualized in post-processing.

In general, the statistical analysis is based on decoded data, namely on the data obtained after the input signal has been decoded according to the respective protocol in order to extract the data signal from the input signal. The decoded data may encompass events that are used for the statistical analysis. Accordingly, the statistical analysis is based on the events in the decoded data, namely the data signal extracted from the input signal. In other words, the statistical analysis takes the respective events into account that are revealed due to the decoding of the input signal, namely the bus signal.

The statistical analysis ensures that the events obtained by decoding the input signal can be analyzed over a certain time range, namely in a statistical manner.

In other words, an analysis of the decoded data is done over a certain time, wherein the decoded data is obtained by processing the input signal by the serial bus decoder.

The respective input signal received and processed by the bus data analysis system may be outputted by a device under test that shall be investigated.

According to an aspect, the statistical analysis is performed in real time. Thus, no blind time or "dead time" occurs, enabling analyses and measurements that were not possible previously. In some embodiments, no blind spots occur in the acquisition of the statistically analyzed data signal due to the statistical analysis in real time.

According to another aspect, the statistical analysis is performed by hardware means, such as hardware circuitry (e.g., one or more digital and analog circuits, etc.). The hardware means ensures that the respective statistical analysis of the data signal extracted can be performed in real time. In contrast, a statistical analysis by software and a central processing unit would be too slow, not enabling real time statistical analysis. Further, a post-processing in hardware or software would cause blind spots, namely blind time or rather "dead time", in which no input signal can be received.

Therefore, the respective method and system according to the present disclosure is particularly useful for long-term bus analyses.

In some embodiments, the method relates to a data compression, as the decoded data is statistically analyzed in order to obtain the statistically analyzed data signal for further processing.

For instance, the statistical analysis is performed by at least one hardware counter. The hardware counter may count the respective events within the decoded data in order to do the statistical analysis, namely counting the respective events.

Further, the hardware counter may be implemented by discrete analog and/or digital circuit elements, one or more field programmable gate arrays (FPGAs) or one or more application-specific integrated circuits (ASICs). The discrete circuit elements, the FPGA(s) or the ASIC(s) may also encompass further components of the bus data analysis system, for instance a serial bus decoder that is used for decoding the input signal.

The data signal extracted may comprise at least one event that is revealed when decoding the input signal. This respective event obtained from the input signal by decoding is used for the statistical analysis that is performed in order to generate the statistically analyzed data signal.

According to an embodiment, a trigger is applied on the statistically analyzed data signal. The trigger may be applied on an accumulation (of events). In some embodiments, the trigger is applied on an accumulation of events in the decoded data. Thus, the trigger is applied on the statistically analyzed data signal obtained after decoding the input signal while processing the decoded data by the hardware counter(s).

Generally, the statistically analyzed data signal may relate to decoded bus statistics, also called bus statistics data.

Therefore, the trigger applied may correspond to a bus statistics trigger. The bus statistics trigger is applied on the statistically analyzed data signal obtained after decoding the input signal and statistically analyzing the result thereof.

For instance, the trigger is applied on the counter reading of the at least one hardware counter, for example counter reading of several hardware counters. Therefore, the trigger may also be applied on relations of counter readings or combinations of counter readings.

Another aspect provides that a trigger event is based on the statistical analysis performed on the data signal extracted from the input signal. This means that the trigger event is based on the output of the statistical analysis of the decoded data, namely a certain accumulation or relation of events associated therewith.

Moreover, the trigger event may concern a specific combination of counter readings. Therefore, the trigger event or rather the trigger function applied relates to a triggering on the decoded bus statistics obtained from decoding the input signal.

In other words, a trigger functionality is provided that applies a trigger on the decoded bus statistics obtained.

In some embodiments, the protocol is established by a line code. The line code corresponds to a simple protocol that may be used for decoding the input signal. For instance, a Manchester-Code is used as line code in some embodiments.

According to an aspect, the analysis circuit or module comprises at least one hardware counter. The hardware counter may be used for performing the statistical analysis of the decoded data by simply counting events within the data signal extracted from the input signal by decoding.

The analysis module may comprise a comparison circuit or module that is configured to identify specific events. In some embodiments, the comparison module has several individual comparison members that can be programmed individually by a user. Hence, certain events or rather functions can be identified within the decoded data. If one of the several individual comparison members identifies a programmed event/function, a signal is issued by the respective comparison member, which is received by the hardware counter associated therewith.

The bus data analysis system may comprise a reset logic connected with the analysis module. The reset logic may reset the at least one hardware counter after a certain condition, for instance a certain time. For this purpose, the reset logic may issue a reset signal to reset the hardware counter after a pre-defined period of time lapsed. The pre-defined period of time may be set by the user. Alternatively or additionally, the reset logic may be connected with a trigger logic such that the reset logic is activated once a trigger event has been verified by the trigger logic. Hence, more than one trigger event can be identified.

According to another aspect, the bus data analysis system comprises at least one acquisition buffer connected with the analysis module. The acquisition buffer may acquire the respective statistically analyzed data signal for further processing. The statistically analyzed data signal may be stored in the acquisition buffer at least temporally for further processing.

In addition, the bus data analysis system may comprise a time stamp circuit or module that provides a time stamp. Accordingly, the decoded bus statistics encompassed by the statistically analyzed data signal may be combined with the respective time stamp provided by the time stamp module. This ensures that a temporal classification of the decoded bus statistics may take place, for instance by means of a post-processing module connected, for example via an interface.

The time stamp module may be connected with the acquisition buffer. Thus, the decoded bus statistics is combined with the time stamp when the respective data is acquired by the acquisition buffer.

Another aspect provides that the bus data analysis system may comprise a trigger logic that applies a trigger on the statistically analyzed data signal. The statistically analyzed data signal is obtained by decoding the input signal. Hence, a trigger function of the decoded bus statistics is enabled, as the trigger is applied on the statistically analyzed data signal.

In some embodiments, the trigger logic (also) receives the time stamps from the time stamp module as well as the statistically analyzed data signal. Thus, the trigger events can also be classified in a temporal manner due to the time stamps received from the time stamp module.

In addition, the bus data analysis system may comprise a software interface. The software interface may be used for post-processing the bus statistics data, namely the statistically analyzed data signal. For this purpose, the software interface may be connected with the acquisition buffer such that the bus statistics data, namely the statistically analyzed data signal, combined with the respective time stamps is forwarded to the software interface for post-processing purposes.

Moreover, software means, such as program code, software instructions, or the like, may be connected with the software interface in order to read the (acquired) data from the acquisition buffer, when executed by a suitable programmable circuit, microprocessor, central processing unit, etc.

The software means may be enabled to classify the acquired data in a temporal manner based on the time stamps provided, which have been combined with the with the bus statistics data.

The software means may also generate track curves based on the acquired data.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
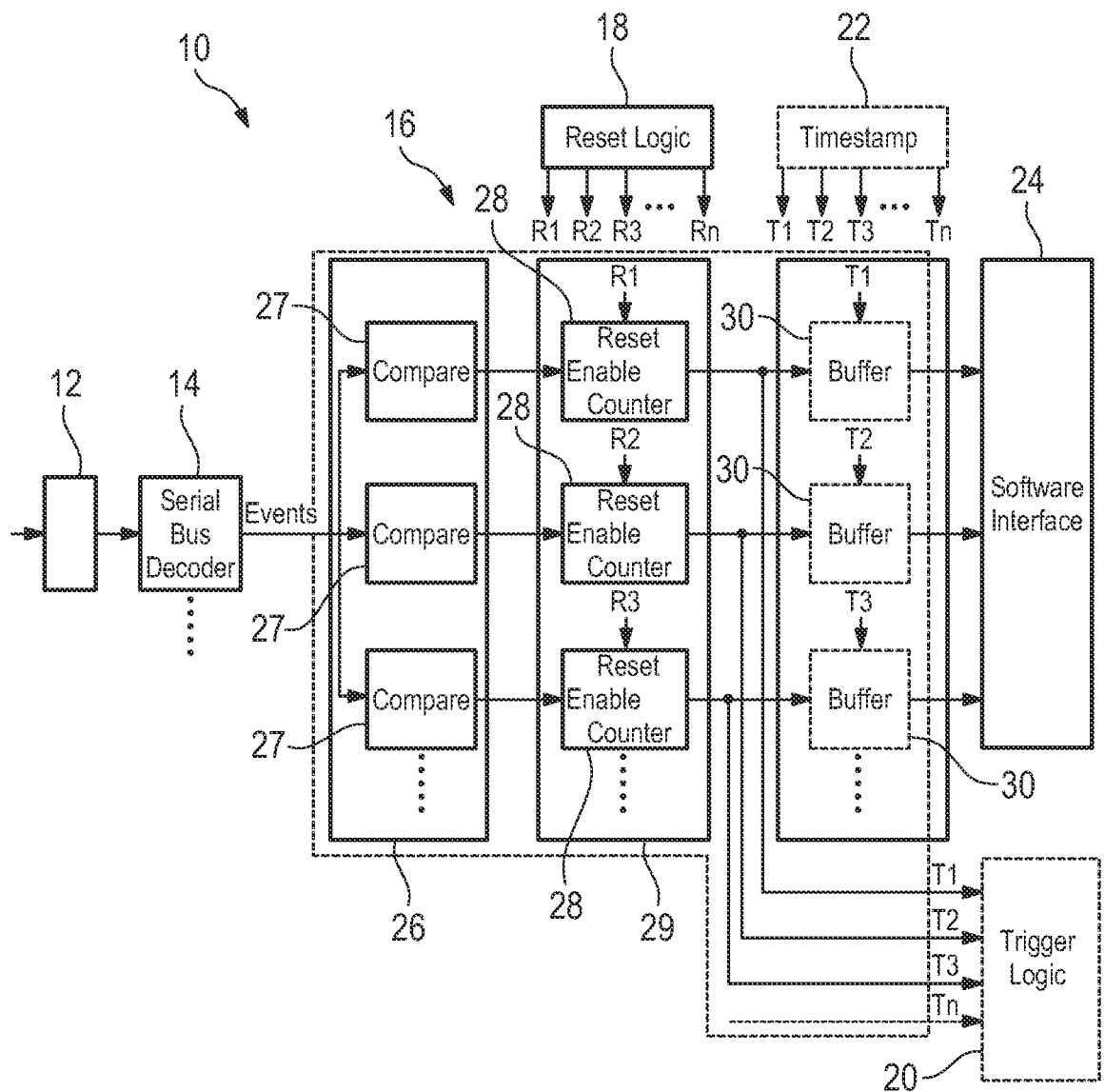
FIG. 1 schematically shows a representative embodiment of a bus data analysis system according to the present disclosure.

FIG. 1 shows a bus data analysis system 10 for analyzing a bus signal as well as data associated therewith. The bus data analysis system 10 comprises an input 12 that is connected with at least one bus decoder 14, which may be established by a serial bus decoder for decoding a serial bus signal used as input signal.

The bus decoder 14 is connected with an analysis circuit or module 16 that is located downstream of the bus decoder 14 such that the analysis module 16 receives the output of the bus decoder 14, namely decoded data, also called data signal. The decoded data may encompass events as shown in FIG. 1.

Generally, the data signal extracted from the input signal by decoding the input signal is analyzed by the analysis module 16 as will be described later.

Furthermore, the bus data analysis system 10 comprises a reset circuit or logic 18, a trigger circuit or logic 20 as well as a time stamp circuit or module 22, which interact with the analysis module 16. The respective information provided by the reset logic 18, the trigger logic 20 as well as the time stamp module 22 are used by the analysis module 16 for analyzing the data signal.

Moreover, a software interface 24 is provided via which the data processed by the bus data analysis system 10, namely the output of the analysis module 16, can be forwarded to a post-processing circuit or module that is connected with the software interface 24. Accordingly, the post-processing module is established by software means, such as program code, software instructions, or the like, which is executable by a suitable programmable circuit, microprocessor, central processing unit, digital signal processor, etc., for carrying out its intended functionality.

The analysis module 16 comprises a comparison circuit or module 26, which may also be called mask unit. The comparison module 26 comprises individual comparison members 27 that are connected with the bus decoder 14. The data signal received from the bus decoder 14 is processed by the comparison module 26, namely the individual comparison members 27.

Further, the analysis module 16 comprises several hardware circuits or counters 28 that are connected with the comparison unit 26, for example the individual comparison members 27 of the comparison unit 26. Accordingly, the hardware counters 28 together form hardware means 29 for a statistical analysis of the data signal obtained from the bus decoder 14.

The hardware counters 28 are further connected with associated acquisition buffers 30 that are used to acquire the outputs of the hardware counters 28. In some embodiments, the acquisition buffers 30 are interconnected between the hardware counters 28 and the software interface 24.

Generally, the bus data analysis system 10 shown in FIG. 1, or any component thereof, may be implemented by hardware means, for instance by one or more field programmable gate array(s) (FPGAs), one or more application-specific integrated circuits (ASICs), discrete circuit elements, etc.

This ensures that the respective processing of the input signal can be done in real time.

Figure 2:
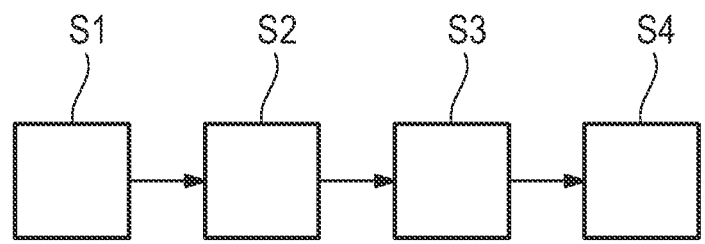
FIG. 2 schematically shows a flow-chart for a representative bus data analysis method.

Hereinafter, the operation of the bus data analysis system 10, for example its individual components, is described with reference to FIG. 2 illustrating a bus data analysis method.

In a first step S1, an input signal is received via the input 12 of the bus data analysis system 10. The input signal may be received from a device under test that is connected with the bus data analysis system 10 in order to analyze the bus signal issued by the device under test, for example the bus data.

In a second step S2, the input signal received is forwarded to the bus decoder 14 for decoding the input signal. Hence, the input signal is decoded according to a protocol, thereby extracting the data signal from the input signal. The data signal extracted corresponds to the decoded data that encompasses events.

In a third step S3, the data signal extracted from the input signal is statistically analyzed by the analysis module 16 that is connected with the bus decoder 14.

The comparison unit 26 may apply a mask on the respective decoded data. The comparison unit 26, for example the individual comparison members 27, will investigate the data signal in order to identify certain events/functions encompassed in the data signal received.

This means that a certain comparison member 27 identifies an associated event in the decoded data, resulting in the issuance of a signal that is forwarded to the hardware counter 28.

Hence, the hardware counter 28 counts the respective event identified by the comparison module 26. In other words, the respective hardware counters 28 connected with the individual comparison members 27 count the associated events encompassed in the data signal obtained by decoding the input signal.

The individual comparison members 27 can be programmed individually in order to set the events/functions to be checked by the comparison members 27.

Furthermore, the reset logic 18 may reset the respective hardware counters 28 after a predefined time lapse, which may be defined/programmed by an operator of the bus data analysis system 10.

Thus, a measurement time or rather analysis time for the statistical analysis can be set accordingly.

In a fourth step S4, the statistically analyzed data signal is forwarded to the corresponding acquisition buffers 30 via respective lines that are also tapped by the trigger logic 20.

Accordingly, at least one trigger is applied on the statistically analyzed data signal obtained from the analysis module 16. Hence, a bus statistics trigger is applied on the statistically analyzed decoded data, namely the statistically analyzed data signal.

Simultaneously, time stamps are provided by the time stamp module 22 that are taken into account by the trigger logic 20 in order to obtain a reference in time by the respective time stamps.

Furthermore, the statistically analyzed data signals are stored in the respective acquisition buffers 30, wherein the time stamps are also combined with the respective statistically analyzed data signal such that a temporal reference can be ensured.

This temporal reference may be used in a post-processing of the acquired data, namely the data (at least temporally) stored in the acquisition buffers 30 by software connected with the software interface 24.

Alternatively or additionally, the trigger logic 20 may be connected with the reset logic 18 such that the respective hardware counters 28 may be reset once a certain trigger event has been detected in the respective statistically analyzed data signal.

Accordingly, an extension of the serial bus decoding is established, as a statistical analysis of the decoded data is provided, yielding the statistically analyzed data signal.

The statistical analysis may be performed over a certain time range that can be defined by the operator, for instance by a user interface. In some embodiments, the operator may program the reset logic 18.

Afterwards, the results of the statistical analysis may be outputted in a graphical manner, for example by post-processing circuit(s) or module(s) connected, for instance via the software interface 24.

A temporal reference of the results of the statistical analysis, namely the statistically analyzed data signal, is ensured due to the time stamps provided by the time stamp module 22.

The trigger logic 20 provides an additional trigger functionality that is applied on the statistically analyzed data signal outputted by the analysis module 16. Therefore, at least one trigger is applied on the bus statistics data that has been decoded previously from the input signal.

Since the respective analysis is performed in real time due to the hardware means used for performing the statistical analysis, no blind spots or blind time occurs.

Generally, the decoding results already available can be used for the respective data analysis, namely the statistical analysis, as the regular decoded data, namely the data signal extracted from the input signal is used by analysis module 16, which in turn outputs new data on which the trigger logic 20 applies its respective trigger.

However, a trigger event in the input signal is not required. In some embodiments, the input signal is decoded completely, wherein the decoded data is statistically analyzed prior to applying the respective trigger.

Furthermore, the data signal obtained from decoding the input signal can be processed directly by the analyzing module 16.

Generally, the method and the bus data analysis system 10 provide a deeper insight in the data of the bus signal due to the additional statistical analysis (and the trigger applied on the results of the statistical analysis).

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A bus data analysis method, said method comprising:
   receiving an input signal;
   decoding said input signal according to a protocol, thereby extracting a data signal from said input signal; and
   analyzing said data signal extracted from said input signal statistically, thereby generating a statistically analyzed data signal such that a statistical analysis of the data obtained after decoding the respective input signal takes place while performing the statistical analysis on the decoded data.

2. The bus data analysis method according to claim 1, wherein said statistical analysis is performed in real time.

3. The bus data analysis method according to claim 1, wherein said statistical analysis is performed by hardware means.

4. The bus data analysis method according to claim 1, wherein said statistical analysis is performed by at least one hardware counter.

5. The bus data analysis method according to claim 1, wherein said data signal extracted comprises at least one event that is revealed when decoding said input signal.

6. The bus data analysis method according to claim 1, wherein a trigger is applied on said statistically analyzed data signal.

7. The bus data analysis method according to claim 1, wherein a trigger event is based on said statistical analysis performed on said data signal extracted from said input signal.

8. The bus data analysis method according to claim 1, wherein said protocol is established by a line code.

9. The bus data analysis method according to claim 4, wherein said hardware counter is implemented by a field programmable gate array (FPGA) or an application-specific integrated circuit (ASIC).

10. The bus data analysis method according to claim 6, wherein said trigger applied corresponds to a bus statistics trigger.

11. A bus data analysis system for analyzing bus data, said bus data analysis system comprising:
    an input for receiving an input signal;
    a bus decoder for decoding said input signal, thereby extracting a data signal from said input signal; and
    an analysis circuit for statistically analyzing said data signal extracted from said input signal, thereby generating a statistically analyzed data signal such that a statistical analysis of the data obtained after decoding the respective input signal takes place while performing the statistical analysis on the decoded data.

12. The bus data analysis system according to claim 11, wherein said analysis circuit comprises at least one hardware counter.

13. The bus data analysis system according to claim 11, further comprising a reset logic connected with said analysis circuit.

14. The bus data analysis system according to claim 11, further comprising at least one acquisition buffer connected with said analysis circuit.

15. The bus data analysis system according to claim 11, further comprising a time stamp circuit that provides a time stamp.

16. The bus data analysis system according to claim 11, further comprising a trigger logic that applies a trigger on said statistically analyzed data signal.

17. The bus data analysis system according to claim 11, further comprising a software interface.

18. The bus data analysis system according to claim 14, further comprising a time stamp circuit that provides a time stamp, said time stamp circuit being connected with said acquisition buffer.

19. The bus data analysis system according to claim 15, further comprising a trigger logic that applies a trigger on said statistically analyzed data signal, said trigger logic receiving said time stamps from said time stamp circuit as well as said statistically analyzed data signal.

20. A bus data analysis method, said method comprising:
receiving an input signal;
decoding said input signal according to a protocol, thereby extracting a data signal from said input signal; and
analyzing said data signal extracted from said input signal statistically, thereby generating a statistically analyzed data signal,
wherein said data signal encompasses events that are used for the statistical analysis such that the events obtained by decoding the input signal are analyzed in a statistical manner.

* * * * *